May 14, 1957 W. E. LARGE ET AL 2,792,528
ELECTRIC DISCHARGE APPARATUS
Filed Jan. 22, 1952 2 Sheets-Sheet 2
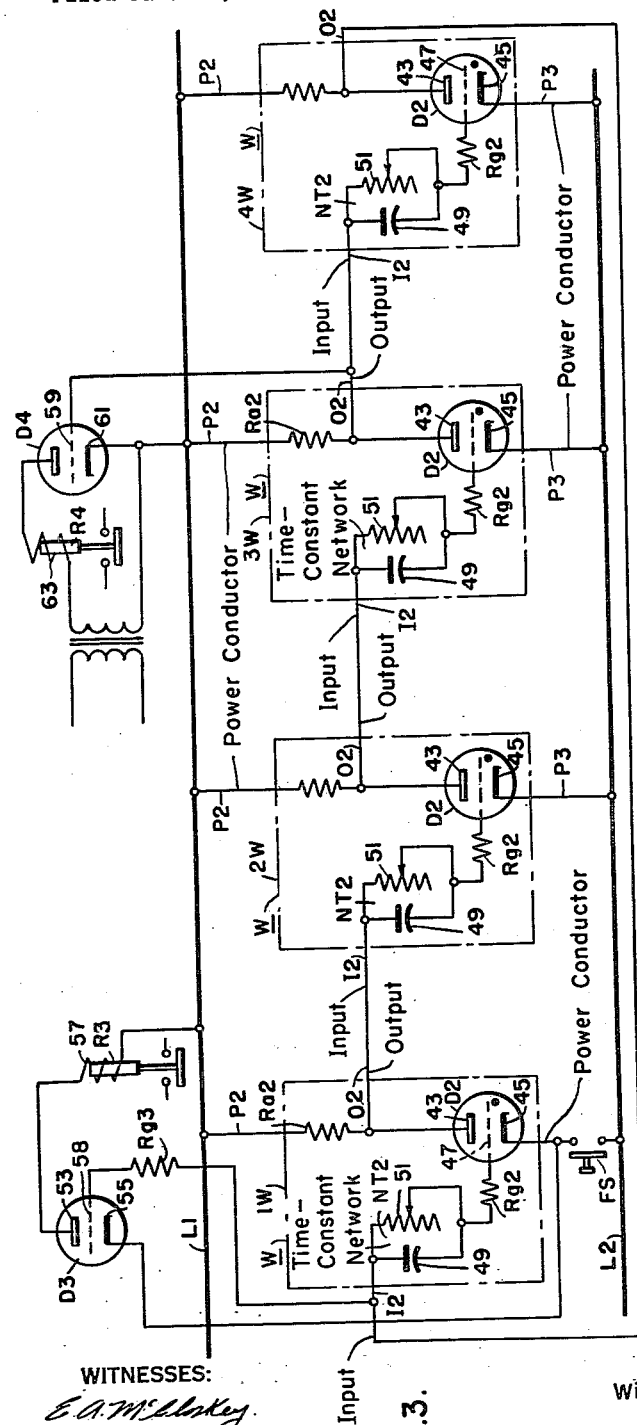
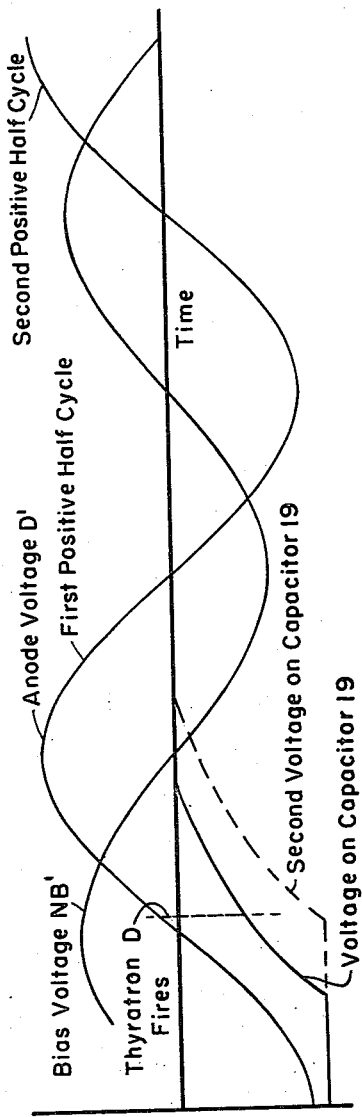
INVENTORS
William E. Large, Clarence B. Stadum
and Edward C. Hartwig.
BY
Hymen Diamond
ATTORNEY

ELECTRIC DISCHARGE APPARATUS

William E. Large, Lancaster, Clarence B. Stadum, Snyder, and Edward C. Hartwig, Lancaster, N. Y., assignors to Westinghouse Electric Corporation, East Pittsburgh, Pa., a corporation of Pennsylvania Application January 22, 1952, Serial No. 267,613

16 Claims. (Cl. 315—252)

Our invention relates to electric-discharge apparatus and has particular relation to electronic timers.

An electronic timer includes an electric discharge device, preferably but not necessarily, a thyratron in the control circuit of which a time-constant network is connected. Such a network may be of the electromagnetic type including an inductive reactor and a resistor, but in the interest of economy is usually of the electrostatic type including a capacitor and a resistor. The charge on the capacitor at any instant controls the conductivity of the discharge device and the timing is effected by producing a change in the conductivity of the device as this charge accumulates or leaks off gradually through a resistor. The resistor determines the rate at which the charge accumulates or leaks off and measures the time taken by the device to change its conductivity.

For example, the capacitor may be initially charged to such a potential that the discharge device is non-conductive; the charging may be then interrupted and the capacitor permitted to discharge through the resistor. When the potential on the capacitor while it is so discharging reaches a predetermined magnitude, the discharge device becomes conductive. The time measured by the circuit is the interval taken by the capacitor to discharge from its initially charged potential to the potential at which the discharge device becomes conductive.

Electronic timing circuits constructed in accordance with the teachings of the prior art are satisfactory for timing intervals of relatively short duration, say from a few periods of a 60 cycle supply to 30 periods or a half second. When the required timing has the magnitude of seconds, electronic circuits operate with a substantial error. For example, we have found that an electronic timer designed for timing intervals of the order of 30 seconds operates with an error of from 7 to 10%, that is, a timer set to time an interval of 30 seconds may time out in anywhere from 27 to 33 seconds.

It is accordingly an object of our invention to provide a highly precise electronic timer for timing intervals of the order of one to 30 seconds.

A general object of our invention is to provide a highly accurate timer for timing periods of substantial duration.

An incidental object of our invention is to provide timing units of convenient structure and function which may be readily combined.

An ancillary object of our invention is to provide novel electronic circuits.

Our invention arises from the discovery that a timer, the time interval of which is measured by a plurality of time-constant networks operating in immediate succession, is substantially more accurate than a timer designed to produce the same time interval with a single time-constant network. This condition arises from the fact, as we have found, that the error of a timer with a single time-constant network is roughly proportional to the time interval of the timer. In a timer composed of a plurality of time-constant networks operating in succession, the error of each network is thus proportional to the corresponding time interval. The error of the composite timer, then, is dependent on the sum of the squares of the errors of the component networks divided by the number of such networks and is roughly equivalent to the error of one network. We have found experimentally that a timer composed of a number of time-constant networks each designed to operate in succession for timing an interval of 30 seconds operates with an error of plus or minus .6 of a second, that is, its error is of the order of 3% as compared to the 7 to 10% error of the timer having a single network.

In accordance with our invention, we provide a timer composed of a plurality of like units, each including a discharge device and a time-constant network designed to time a fraction of the total interval over which the timer is to operate. These units are so constructed that any desired number of them may be combined into a timer to provide the desired time interval. A timer for timing a relatively long time interval of the order of 30 seconds which is highly accurate may thus be provided by combining the requisite number of timing units.

The accuracy may be further improved by maintaining the error of each component network at a minimum. We have found that the time interval T during which a network connected in the control circuit of a thyratron times out is given by the equation $$T = RC \log Ec/Eg$$

in which:

R is the resistance of the network
C is the capacity of the network
$Ec$ is the initial potential on the capacitor
$Eg$ is the critical grid potential of the thyratron.

$Ec$ is at least approximately equivalent to the anode potential, $Ea$, on the thyratron. The error in the timing of such a network arises predominantly from variations in the initial charge in the capacitor and in the variations of the initial grid potential, that is $$\frac{Ec}{Eg}$$

In terms of this fraction, the error may be expressed as $$dT = RCd\left(\log \frac{Ec}{Eg}\right) = RC\frac{Eg}{Ec}$$

That is, the error varies directly as the grid potential, usually one or two volts, but inversely as the initial charge on the capacitor and may be decreased by increasing the initial charge on the capacitor to as high a magnitude as practicable. In effect, then, it is desirable to maintain the anode potential on the thyratron so that $$\frac{Ec}{Eg}$$

is a maximum. The following data was derived from a circuit including a thyratron tube 2050.

| $Ea$ in volts | $Eg$ in volts | $Ea/Eg$ | $\log \frac{Ea}{Eg}$ |
|---|---|---|---|
| 200 | 2.6 | 77 | 4.35 |
| 175 | 2.2 | 79.5 | 4.38 |
| 150 | 2.0 | 75 | 4.32 |
| 125 | 1.8 | 69.5 | 4.24 |
| 100 | 1.6 | 62.7 | 4.14 |

As is explained above, this circuit has the highest accuracy when $$\frac{Ea}{Eg}$$

is a maximum, that is at 175 volts anode potential.

The novel features which we consider characteristic of our invention are set forth with particularity in the appended claims. The invention itself, however, both as to its organization and its method of operation, together with additional objects and advantages thereof, will be understood from the following description of specific embodiments when read in connection with the accompanying drawings, in which:

Fig. 2 is a graph illustrating the operation of Fig. 1, and

Fig. 3 is a circuit diagram of a modification of our invention.

Figure 1:
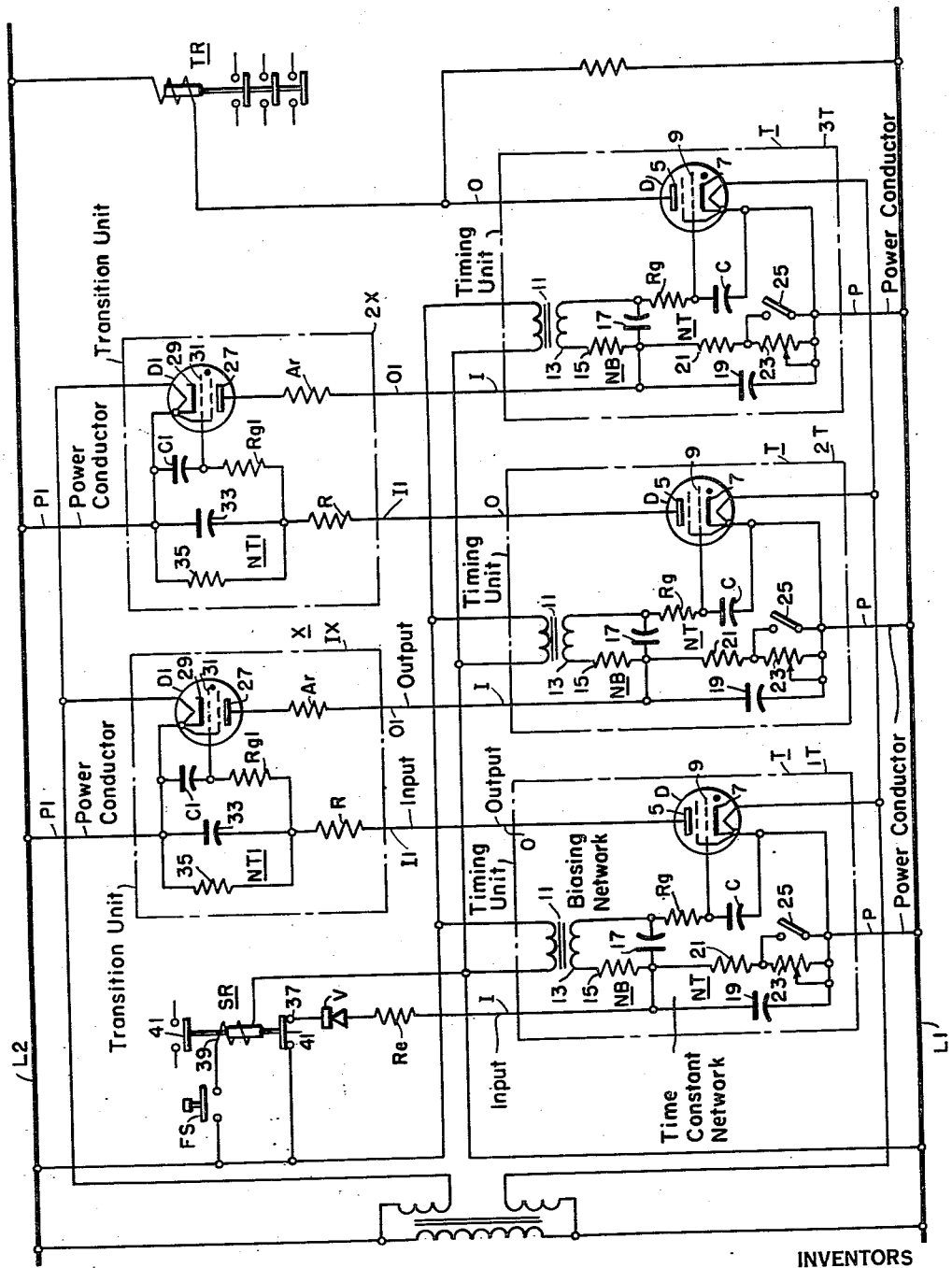
Figure 1 is a circuit diagram of a preferred embodiment of our invention.

The apparatus shown in Fig. 1 comprises a plurality of like timing units T such as 1T, 2T, 3T interconnected through a plurality of like transition units X such as 1X, 2X. Each timing unit T is designed to time a relatively short time interval. The timing units are so connected that they operate in succession to time a relatively long time interval. Depending on the duration of the long timing interval, any number of such timing units T may be interconnected.

Each timing unit T includes an electric discharge device D, preferably a thyratron, having an anode 5, a cathode 7 and a control electrode 9. The anode is connected to an output conductor O. The cathode 7 is connected to a power supply conductor P.

The timing unit also includes a biasing network NB and a time-constant network NT. The biasing network NB is connected to the control electrode 9 through a grid resistor Rg. The time-constant network NT is connected between the biasing network NB and the cathode 7. An input conductor I is connected to the junction of the time-constant network NT and the biasing network NB. A surge suppressing capacitor C is connected between the control electrode 9 and the cathode 7.

The biasing network comprises a transformer 11 across the secondary 13 of which a resistor 15 and a capacitor 17 are connected in series. The primary of the transformer is adapted to be connected to the supply from which the unit may be energized.

The time-constant network NT comprises a timing capacitor 19 shunted by a pair of resistors, 21 and 23, one of which is variable 23 and the other 21 of which may be variable if desired. Across the variable resistor 23 a switch 25 is connected. With the switch open, the characteristic time interval of the network NT is determined by the two resistors 21 and 23 and is longer than with the switch 25 closed. The characteristic interval of the network may be further changed by adjusting the setting of the variable resistor 23. Each timing unit T thus includes facilities for setting its individual time interval over a predetermined range. The combination of timing units T may thus be set for a long time interval which may be varied over a predetermined range.

Before a timing operation of any unit T is initiated, its timing capacitor 19 is charged with its plate which is connected to the biasing network NB negative and the other plate positive. Under such circumstances, a negative potential is impressed by the capacitor 19 through the biasing network NB between the control electrode 9 and the cathode 7. The potential impressed by the biasing network NB has the same frequency as the anode-cathode potential impressed on the discharge device D. However, the biasing potential leads the anode-cathode potential in phase by an angle of the order of from 30 to 90°. This biasing potential tends to render the discharge device conductive at the beginning of its positive half period of anode-cathode potential. However, conduction is prevented by the negative potential impressed by the timing capacitor 19.

To initiate a timing operation, the charging of the timing capacitor 19 is interrupted. The capacitor then discharges through the resistors 21 and 23 in parallel with it, and its blocking potential is reduced. When the blocking potential decreases to a magnitude such that the net potential impressed in the control circuit algebraically exceeds the critical potential, the discharge device D becomes conductive, marking the termination of the timed interval. The discharge device, however, can be initially rendered conductive only during the portion of the positive half period of anode-cathode potential during which the biasing potential (NB) is positive. If, during this half period, the potential of the time-constant capacitor 19 rises to substantially the magnitude of the critical potential (NB) after the biasing potential has become negative, the discharge device is not rendered conductive during this half period, but is rendered conductive during the next positive half period. This manner of operation assures that once the conductivity of the discharge device is initiated, it conducts during a substantial fraction of the half period. Positive operation of the successive timing units NT is thus assured.

The operation of the biasing circuit is illustrated in the graph shown in Fig. 2. In this graph, voltage is plotted vertically and timed horizontally. The anode voltage D' impressed on the thyratron D is represented by the sine wave of larger amplitude; the control voltage NB' impressed by the biasing network NB by the sine wave of smaller amplitude. It is seen that the latter wave leads the former by an angle of the order of 90°. One voltage decay curve of the timing capacitor is represented by the full line curve below the time axis, another by a broken line curve to the right of the first.

It may be assumed that the critical voltage of the thyratron D is zero. Under such circumstances, the thyratron D would be fired early in the half period as indicated in the situation in which the capacitor discharge is represented by the full-line curve to the left. For the situation represented by the broken-line curve to the right, the thyratron would not fire until the second positive half period.

Each transition unit X includes an electric discharge device D1, preferably a thyratron having an anode 27, a cathode 29 and a control electrode 31. The anode 27 is connected through an anode resistor Ar to an output conductor O1. The cathode 29 is connected to a power supply conductor P1. The transition unit X also includes a time-constant network NT1 consisting of a capacitor 33 and a resistor 35 connected in parallel. The network NT1 is set for a relatively low time interval. This network NT1 is connected through a grid resistor Rg1 to the control electrode 31 of the thyratron D1 and directly to the cathode 29. An input conductor I1 is connected through a resistor R to the junction of the grid resistor Rg1 and the network NT1. A surge suppressing capacitor C1 is connected between the control electrode 31 and the cathode 29.

The transition unit is controlled by the charging and discharging of the time-constant capacitor 33. With this capacitor charged, a negative potential is impressed between the control electrode 31 and the cathode 29, and the thyratron D1 is non-conductive. When the charging of this capacitor 33 is interrupted, the capacitor quickly discharges through its resistor 35, permitting the thyratron to become conductive.

To provide a timer having a predetermined long time interval, the requisite number of timing units T and transition units X must be interconnected. The power supply conductor P of the timing units are connected together and the power supply conductors P1 of the transition units X are connected together. The former (P) are connected to one bus L1 of a single-phase supply, and the latter (P1) to the other bus of a single-phase supply. The output conductor O of the first timing unit 1T is then connected to the input conductor I1 of the first transition unit 1X, the output conductor O1 of the first transition unit 1X to the input conductor I of the second timing unit 2T, the output conductor of the second timing unit to the input conductor I1 of the second transition unit 2X, the output conductor of the second transition unit to the input conductor I of the third timing unit 3T. The interconnection shown for two transition units and three timing units is the same for (n—1) transition units and n timing units.

The input conductor of the first timing unit 1T is connected to one of the buses L2 through normally-closed contacts 37 of a starting relay SR, a rectifier V, and a current limiting resistor Re. The output conductor of the third (or nth) timing unit 3T is connected to a translation device, such as the exciting coil of a relay TR for example, which is to indicate, or perform an operation at, the end of the timing interval.

Before the timing operation, the timing capacitor 19 of the first timing unit 1T is charged through the rectifier V so that its thyratron D is non-conductive. At this time, then, the time-constant capacitor 33 of the first transition unit 1X is discharged so that its associated thyratron D1 is conductive. Through this thyratron, the timing capacitor 19 of the second timing unit 2T is charged so that its thyratron D is non-conductive; similarly, the second transition thyratron D is non-conductive; similarly, the second transition thyratron D1 is conductive and the third timing thyratron D is non-conductive.

A timing operation is initiated by operation of a push button or foot switch FS which closes a circuit through the exciting coil 39 of the starting relay SR. This relay is actuated and its normally closed contacts 37 are opened, discontinuing the charging of the first timing capacitor 19 and initiating the timing operation. If necessary or desirable, a circuit through any translation or indicating device (not shown) may be closed by now-closed contacts 41 of the relay SR to indicate the start of the timing interval.

The timing capacitor 19 of the unit 1T now discharges through the timing resistors 21 and 23 and a predetermined time interval after the start of the discharging, the thyratron D of the resistor 1T is rendered conductive, charging the time-constant capacitor 33 of the first transition unit 1X. Since the thyratron D of the first unit 1T can be rendered conductive only early in its first positive half period of anode-cathode potential, the time-constant capacitor 33 of the first transition unit 1X receives a substantial charge and operates positively to block the thyratron D1 of the first transition unit. The charging to the capacitor 19 of the second timing unit 2T is now interrupted and the latter discharges during the timing interval for which it is set. At the end of this timing interval, the thyratron D of the second timing unit 2T is rendered conductive, rendering the thyratron D1 of the second transition unit 2X non-conductive and causing the capacitor 19 of the third timing unit 3T to discharge in a similar manner. When the latter capacitor 19 discharges, the relay TR connected to the output conductor O of its thyratron D becomes energized, indicating the end of the timing interval or producing the desired operation at this time.

A timer which operates with a long time interval composed of successive relatively short time intervals, is thus provided. Since the error of this time is approximately proportional to the error of a single one of the timing units, this error is relatively small and highly accurate timing is achieved. The accuracy can be further improved by setting the potentials of the system so that the ratio of the potential on the capacitors 19 at the start of a timing operation to the critical potential of the thyratron D is a maximum.

In a system which we have found to operate satisfactorily the following components are included.

Thyratrons D and D1_ Type WL2050 (sold by W. E. Corp.).
Relay Cr_____ Westinghouse Style 1008539.
Relay TR_____ Westinghouse Style 1537212.
Rectifier V_____ Westinghouse Style 1501171.
Resistor Re_____ 100 ohms.
Resistor 21_____ 2200 ohms.
Resistor 23_____ of the order of 250,000 ohms.
Capacitor 19_____ 10 microfarads (Westinghouse Style 1392007).
Resistor 15_____ 22,000 ohms.
Capacitor 17_____ .5 microfarads.
Resistor Rg, Rgt_____ 100,000 ohms.
Capacitors C, C1____ .0022 microfarads.
Resistor R_____ 100 ohms.
Capacitor 33_____ .5 microfarad.
Resistor 35_____ 6800 ohms.
Supply 50 or 60 cycles_ commercial.

The apparatus shown in Fig. 3 is a timing system which requires only timing units and not transition units. This apparatus includes a plurality of like timing units such as 1W, 2W, 3W and 4W each designed to produce a relatively short timing operation. The timing units W are connected in such manner that they time out in succession to produce a long timing interval.

Each unit W comprises a thyratron D2 having an anode 43, a cathode 45 and control electrode 47. The anode 43 is connected to a power supply conductor P2 through an anode registor Ra2. The cathode 45 is connected to a second power supply conductor P3. A time-constant network NT2 consisting of a capacitor 49 shunted by a variable resistor 51 is connected to the control electrode 47 through a grid resistor Rg2. An input conductor I2 is connected to the time-constant network NT2 and an output conductor O2 to the junction of the anode 43 and the anode resistor Ra2.

Before a timing operation is initiated, the thyratron D2 of each timing unit W execpt W1 is conductive. The time-constant network NT2 is connected to the power supply L1, L2 in such manner that its capacitor 49 is charged by the current flow between the control electrode 47 and the cathode 45 with its plate adjacent to the control electrode 47 negative and the other plate positive. A timing operation is initiated by connecting the time-constant network NT2 to the cathode 45. The negative potential impressed on the capacitor then becomes effective, rendering the thyratron D2 non-conductive. The capacitor 49 now discharges through the variable resistor 51 and after a predetermined time interval the negative potential reaches so low a magnitude that the thyratron again becomes conductive. The time interval characteristic of the unit is the time between the instant when the thyratron D2 is rendered non-conductive and when it again becomes conductive.

When a plurality of units 1W, 2W, 3W and 4W are combined into a timing system, the power supply conductors P2 of the units which are connected to the anode resistors Ra2 are connected together and the power supply conductors P3 which are connected to the cathodes 45 are connected together, and each group of conductors P2 and P3 respectively is connected to a bus L1 and L2 respectively of a single-phase power supply. The units are arranged in succession, the output conductor O2 of the first unit 1W being connected to the input conductor I2 of the second, 2W, the output conductor O2 of the second to the input conductor I2 of the third, 3W, the output conductor of the third to the input conductor of the fourth, 4W. Other units W may be added in similar manner.

The output conductor O2 of the fourth unit 4W is connected to the input conductor of the first unit 1W. The anode-cathode circuit of the first unit is maintained open by a push-button FS so that the thyratron of this unit is non-conductive.

To produce the necessary operation at the beginning or at the end of the time interval, a fifth thyratron D3 is connected in parallel with the thyratron D2 of the first unit 1W. The anode 53 of thyratron D3 is connected to the output conductor P2 of the unit 1W through the coil 57 of a relay R3. The cathode 55 of the thyratron D3 is connected to the cathode 45 of the thyratron D2, and the control electrode 58 of this thyratron D3 is connected through a grid resistor Rg3 to the timing network NT2 of the thyratron D2. Another thyratron D4 may be connected to be controlled by the thyratron D2 of another unit such as the third 3W. The control electrode 59 is connected to the anode 43 of the thyratron D2 and the cathode 61 to the power conductor P2. The anode-cathode circuit of thyratron D4 includes the exciting coil of a relay R4.

With the anode circuit of the thyratron D2 of the first unit 1W open, this thyratron is non-conductive and the fifth thyratron D3 in parallel with it is non-conductive so that the relay R3 is deenergized. Since the control electrode of the second thyratron D2 is connected to its anode through the time-constant network NT2 of the second unit 2W, the thyratron D2 of the second unit 2W is conductive. The thyratron D2 of the third unit 3W is also conductive, since initially the timing capacitor of the third unit is discharged. For the same reason, the thyratron D4 of the fourth timing 4W unit is also conductive.

To initiate a timing operation, the anode circuit of the thyratron D2 of the first unit 1W is closed by the switch FS. This thyratron immediately becomes conductive since the timing capacitor 49 of the first unit is discharged. The fifth thyratron D3 in parallel with this thyratron is also rendered conductive and the relay R3 is operated to indicate the start of the timing operation.

When the thyratron D2 of the first unit 1W becomes conductive, the time-constant network NT2 of the second unit 2W is in effect connected to the cathode of its thyratron D2 and the latter is rendered non-conductive. While the thyratron of the second unit 2W is non-conductive, the timing capacitor 49 of the third unit charges so that its plate adjacent to the control electrode of its thyratron D2 is negative and the other plate is positive. Eventually, the potential on the timing capacitor 49 of the second unit 2W decays to a point at which the thyratron D2 of this second unit becomes conductive. The thyratron of the third unit 3W is now rendered non-conductive and negative potential is impressed on the capacitor 49 of the fourth unit. The thyratron of the third unit remains non-conductive until its associated capacitor 49 discharges, thereafter becoming conductive. At this point, the thyratron of the fourth unit 4W becomes non-conductive, permitting the capacitor 49 of the first unit to charge. This thyratron becomes conductive when its associated capacitor 49 discharges, rendering the thyratron D2 of the first unit 1W and the thyratron D3 in parallel with it, non-conductive. The timing interval is now complete. Thus, a timer is provided which produces a long time-interval composed of a plurality of successive short time intervals. The accuracy of this circuit is improved by maintaining the ratio of the potential of capacitor 49 at the beginning of a timing operation to the critical potential of thyratron D2 at a maximum.

If desired, intermediate operations may be produced while the timing units are timing out. Such an intermediate operation may, for example, be produced by the thyratron D2 of the third timer 3W which may control the sixth thyratron D4. The control electrode 59 of the latter is connected to the output conductor O2 of the thyratron D2 of the third unit 3W and the cathode 61 to the power supply conductor P2. Under such circumstances, the sixth thyratron D4 is non-conductive during the initial operation of the timing system when the thyratron of the third unit is conductive, because of the bias impressed by the anode resistor Ra2 of the third unit 3W. When, during the timing operation, the thyratron D2 of unit 3W is rendered non-conductive, the sixth thyratron D4 becomes conductive and operates the relay R4. The sixth thyratron D4 now remains conductive only until the thyratron of the third unit 3W becomes conductive at the end of the timing interval of this unit.

Our timer may be combined in a resistance welding system. In such a system the relay R3 would initiate the squeeze interval and the relay R4 the hold interval. The hold interval is then timed by the fourth unit 4W, and the off interval by the first unit 1W.

While we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In combination, a gaseous electric discharge device having an anode, a cathode and a control electrode; a pair of terminals for supplying an alternating potential; means for connecting said anode to one of said terminals; means for connecting said cathode to the other of said terminals; a biasing network consisting of a capacitor, a resistor of substantial resistance and means for deriving a potential from said terminals connected in series, said network supplying a bias potential derived from said derived potential and said deriving means deriving said derived potential independently of said device; a time-constant network comprising a capacitor of substantial capacity and a resistor of substantial resistance; and means including said time constant network and said biasing network in series, connecting said control electrode to said cathode.

2. As an article of manufacture, a timing unit for combination with like units comprising a gaseous electric discharge device having an anode, a cathode and a control electrode; a power supply conductor connected to said cathode; an output conductor connected to said anode; a time-constant network, including a capacitor of substantial capacity and a resistor of substantial resistance, and a biasing network connected in series between said control electrode and said cathode; an input conductor directly connected to the junction of said time-constant network and said biasing network, and means including said input conductor for controlling the charge on said time-constant network independently of said biasing network.

3. As an article of manufacture, a timing unit for combination with like units comprising a gaseous electric discharge device having an anode, a cathode and a control electrode; a first power-supply conductor; an anode resistor of substantial resistance directly connected between said conductor and said anode; a second power-supply conductor connected to said cathode; an input conductor; a time-constant network including a capacitor of substantial capacity and a resistor of substantial resistance connected between said input conductor and said control electrode and an output conductor connected to the junction of said anode and said resistor.

4. In combination a first power supply conductor; a second power conductor; a first gaseous valve having an anode, a cathode and a control electrode; means connecting said anode to said first conductor; means connecting said cathode to said second conductor; means including a first time constant network connecting said control electrode to said first conductor; a second gaseous valve having an anode, a cathode and a control electrode; means connecting said last-named anode to said first conductor; means connecting said last-named cathode to said second conductor; and means including a second time constant network connecting said last-named control electrode to said anode of said first-named valve.

5. In combination, $n-1$ transition units, said units being herein individually identified as 1st unit, 2nd unit, 3rd unit . . . $(n-1)$st unit, and each unit comprising a power supply conductor, an input conductor, an output conductor, a gaseous electric discharge device having an anode, a cathode, and a control electrode, and a time-constant network having a relatively short time constant; said cathode being connected to said power supply conductor, said control electrode being connected to said input conductor, said anode being connected to said output conductor and said network being connected between said control electrode and said cathode; $n$ timing units, said last-named units being herein individually identified as 1st unit, 2nd unit . . . $n$th unit, each said timing unit comprising a power supply conductor, an input conductor, an output conductor, a gaseous electric discharge device having an anode, a cathode and a control electrode, a time-constant network having a substantially longer time constant than said networks of said transition units and biasing means; said last-named cathode being connected to said last-named power-supply conductor, said time-constant network of said timing unit, said biasing means, said last-named control electrode and said last-named cathode being connected in series, said last-named input conductor being connected to the junction of said last-named time-constant network and said biasing means and said last-named anode being connected to said last-named output conductor; means connecting the output conductor of each timing unit to the input conductor of the transition unit having the same ordinal identification as said last-named timing unit; means connecting the output conductor of each transition unit to the input conductor of the timing unit having the next higher ordinal identification as said transition unit; means connecting the power supply conductors of said transition units together; means connecting the power-supply conductors of said timing units together; and translating means connected to the output conductor of the $n$th timing unit.

6. In combination, $n$—1 transition units, said units being herein individually identified as 1st unit, 2nd unit, 3rd unit . . . ($n$—1)st unit, and each unit comprising a power supply conductor, an input conductor, an output conductor, a gaseous electric discharge device having an anode, a cathode, and a control electrode, and a time-constant network, said network having a relatively short time constant; said cathode being connected to said power supply conductor, said control electrode being connected to said input conductor, said anode being connected to said output conductor and said network being connected between said control electrode and said cathode; $n$ timing units, said last-named units being each herein individually designated as 1st unit, 2nd unit . . . $n$th unit, and each said timing unit comprising a power supply conductor, an input conductor, an output conductor, a gaseous electric discharge device having an anode, a cathode and a control electrode, a time-constant network having a substantially longer time constant than said networks of said timing units, and biasing means; said last-named cathode being connected to said last-named power supply conductor, said time-constant network of said timing unit, said biasing means, said last-named control electrode and said last-named cathode being connected in series, said last-named input conductor being connected to the junction of said last-named time-constant network and said biasing means and said last-named anode being conected to said last-named output conductor; means connecting the output conductor of each timing unit to the input conductor of the transition unit having the same ordinal identification as said timing unit; means connecting the output conductor of each transition unit to the input conductor of the timing unit having the next higher ordinal identification as said transition unit; means connecting the power supply conductors of said transition units together; means connecting the power-supply conductors of said timing units together; means for charging the time-constant network of said 1st timing unit; and translating means connected to the output conductor of the $n$th timing unit.

7. In combination, $n$ timing units arranged in a predetermined succession and herein individually identified by the ordinals 1st unit, 2nd unit, 3rd unit . . . $n$th unit in said succession, and each said timing unit comprising a first power-supply conductor, a second power-supply conductor, an input conductor, an output conductor, a time-constant network and a gaseous electric discharge device having a control electrode and a plurality of principal electrodes; said power supply conductors being connected respectively to said principal electrodes, said output conductor being connected to one of said principal electrodes and said time-constant network being connected between said input conductor and said control electrode; means connecting the first power-supply conductors of all units in said succession together; means connecting the second power-supply conductors of all units in said succession together; and means connecting the output conductor of each unit to the input conductor of the unit having the next higher ordinal.

8. In combination, $n$ timing units arranged in a predetermined succession and herein individually identified by the ordinals 1st unit, 2nd unit . . . $n$th unit in said succession, and each said timing unit comprising a first power-supply conductor, a second power-supply conductor, an input conductor, an output conductor, a time-constant network and a gaseous electric discharge device having a control electrode and a plurality of principal electrodes; said power-supply conductors being connected respectively to said principal electrodes, said output conductor being connected to one of said principal electrodes and said time-constant network being connected between said input conductor and said control electrode; means connecting the first power-supply conductors of all units in said succession together; means connecting the output conductor of each unit to the input conductor of the unit having the next higher ordinal in said succession; manual means for manually maintaining the principal circuit of one unit in said succession open and, at the will of an operator, closing it; and translating means operable by one of the units in said succession.

9. In combination, $n$ timing units arranged in a predetermined succession and individually identified by the ordinals 1st unit, 2nd unit, 3rd unit . . . $n$th unit in said succession, and each said timing unit comprising a first power-supply conductor, a second power-supply conductor, an input conductor, a time-constant network and a gaseous electric discharge device having a control electrode and a plurality of principal electrodes; said power-supply conductors being connected respectively to said principal electrodes, said output conductor being connected to one of said principal electrodes and said time-constant network being connected between said input conductor and said control electrode; means connecting the first power-supply conductors of all units in said succession together; means connecting the output conductor of each unit to the input conductor of the unit in said succession having the next higher ordinal; manual means for manually maintaining the principal circuit of the 1st unit in said succession open and, at the will of an operator, closing it; and translating means operable by one of the units in said succession.

10. In combination, $n$ timing units arranged in a predetermined succession and herein individually identified by the ordinals 1st unit, 2nd unit . . . $n$th unit in said succession, and each said unit comprising a first power-supply conductor, a second power-supply conductor, an input conductor, an output conductor, a time-constant network and a gaseous electric discharge device having a control electrode and a plurality of principal electrodes; said power supply conductors being connected respectively to said principal electrodes, said output conductor being connected to one of said principal electrodes and said time-constant network being connected between said input conductor and said control electrode; means connecting the first power-supply conductors of all units in said succession together; means connecting the output conductor of each unit to the input conductor of the unit having the next higher ordinal in said succession; manual means for maintaining the principal circuit of the 1st unit in said succession open and, at the will of an operator, closing it; and translating means operable by said 1st unit in said succession.

11. In combination, $n$ timing units arranged in a predetermined succession and herein individually identified by the ordinals 1st unit, 2nd unit . . . $n$th unit in said succession; each unit comprising a first power-supply conductor, a second power-supply conductor, an input conductor, an output conductor, a time-constant network and a gaseous electric discharge device having a control electrode, an anode and a cathode; said first power-supply conductor being connected to said anode, said second power-supply conductor being connected to said cathode, said output conductor being connected to said anode, and said time-constant network being connected between said input conductor and said control electrode; means connecting the first power-supply conductors of all units in said succession together; means connecting the second power-supply conductors of all units in said succession together; and means connecting the output conductor of each unit to the input conductor of the unit having the next higher ordinal in said succession.

12. Apparatus for timing an event comprising in combination, $n-1$ transition units, said units being individually identified herein as 1st unit, 2nd, 3rd unit . . . $(n-1)$st unit, and each unit comprising a power supply conductor, an input conductor, an output conductor, a gaseous electric discharge device having an anode, a cathode, and a control electrode, and a time-constant network, having a relatively short time constant; said cathode being connected to said power supply conductor, said control electrode being connected to said input conductor, said anode being connected to said output conductor and said network being connected between said control electrode and said cathode; $n$ timing units, said timing units being individually identified herein as 1st unit, 2nd unit, 3rd unit . . . $n$th unit, each timing unit comprising a power supply conductor, an input conductor, an output conductor, a gaseous electric discharge device having an anode, a cathode and a control electrode, a time-constant network having a substantially longer time constant than that of said first-mentioned timing units and biasing means; said last-named cathode being connected to said last-named power-supply conductor, said time-constant network of said timing unit, said biasing means, said last-named control electrode and said last-named cathode being connected in series, said last-named input conductor being connected to the junction of said last-named time-constant network and said biasing means and said last-named anode being connected to said last-named conductor; means connecting the output conductor of each timing unit to the input conductor of the transition unit having the same ordinal identification as said last-named timing unit; means connecting the output conductor of each transition unit to the input conductor of the timing unit which has the next higher ordinal identification as said last-named transition unit; means connecting the power supply conductors of said transition units together; means connecting the power-supply conductors of said timing units together; means connected to the first of said succession of timing units for initiating the timing of said event; and means connected to the $n$th of said succession of timing units for terminating the timing of said event.

13. Apparatus for timing an event comprising in combination, $n$ timing units arranged in a predetermined succession and individually identified as 1st unit, 2nd unit . . . $n$th unit in said succession, and each timing unit comprising a first power-supply conductor, a second power-supply conductor, an input conductor, an output conductor, a time-constant network and a gaseous electric discharge device having a control electrode and a plurality of principal electrodes; said power supply conductors being connected respectively to said principal electrodes, said output conductor being connected to one of said principal electrodes and said time-constant network being connected between said input conductor and said control electrode; means connecting the first power-supply conductors of all units in said succession together; means connecting the second power-supply conductors of all units in said succession together; means connecting the output conductor of each unit to the input conductor of the unit having the next higher ordinal number in said succession; means connected to the 1st unit of said succession for initiating the timing of said event; and means connected to the $n$th unit of said succession for terminating the timing of said event.

14. In combination, a gaseous electric discharge device having an anode, a cathode and a control electrode; a pair of terminals for supplying an alternating potential; means connecting said anode to one of said terminals; means connecting said cathode to the other of said terminals; a biasing network consisting of a capacitor, a resistor and means for deriving a potential from said terminals connected in series; a time-constant network; and means for connecting said time-constant network, said biasing network, said control electrode and said cathode in series, said biasing network being so connected as to impress a potential between said control electrode and said cathode which leads in phase the potential impressed from said terminals between said anode and cathode.

15. In combination, $n-1$ transition units, said units being herein individually identified as 1st unit, 2nd unit, 3rd unit . . . $(n-1)$st unit, and each unit comprising a power supply conductor, an input conductor, an output conductor, a gaseous electric discharge device having an anode, a cathode, and a control electrode, and a time-constant network having a relatively short time constant; said cathode being connected to said power supply conductor, said control electrode being connected to said input conductor, said anode being connected to said output conductor and said network being connected between said control electrode and said cathode; $n$ timing units, said last-named units being herein individually identified as 1st unit, 2nd unit . . . $n$th unit, each said timing unit comprising a power supply conductor, an input conductor, an output conductor, a gaseous electric discharge device having an anode, a cathode and a control electrode, a time-constant network having a substantially longer time constant than said networks of said transition units, and biasing means; said last-named cathode being connected to said last-named power-supply conductor, said time-constant network of said timing unit, said biasing means, said last-named control electrode and said last-named cathode being connected in series, said last-named input conductor being connected to the junction of said last-named time-constant network and said biasing means and said last named anode being connected to said last-named output conductor; means connecting the output conductor of each timing unit to the input conductor of the transition unit having the same ordinal identification as said last-named timing unit; means connecting the output conductor of each transition unit to the input conductor of the timing unit having the next higher ordinal identification as said transition unit; means connecting the power supply conductors of said transition units together; means connecting the power-supply conductors of said timing units together; and translating means connected to the output conductor of the $n$th timing unit; said biasing means of each timing unit being connected so as to impress a potential leading the potential impressed by said power supply conductors between the anode and cathode of said discharge device of said timing unit in phase by a small angle.

16. In combination, a first gaseous electric discharge device having an anode, a cathode and a control electrode, biasing means including a capacitor of substantial capacity and a resistor of substantial resistance, a time-constant network, means, including said biasing means and said network in series, connecting said control electrode to said cathode, a pair of terminals for supplying a potential, means connecting said anode to one of said terminals, means connecting said cathode to the other of said terminals, a second gaseous electric discharge device having an anode and a cathode and means for connecting said terminals to said network through said anode and cathode.

References Cited in the file of this patent

UNITED STATES PATENTS

| | | |
|---|---|---|
| 2,482,892 | Barwick | Sept. 27, 1949 |
| 2,487,150 | Lexa | Nov. 8, 1949 |
| 2,533,318 | Hartwig | Dec. 12, 1950 |
| 2,540,514 | Elliott | Feb. 6, 1951 |
| 2,573,360 | Rockafellow | Oct. 30, 1951 |
| 2,577,411 | Faulk | Dec. 4, 1951 |